United States Patent
Simonsson

(10) Patent No.: US 6,953,018 B2
(45) Date of Patent: Oct. 11, 2005

(54) VALVE ARRANGEMENT FOR A COMBUSTION ENGINE

(76) Inventor: Per Simonsson, Steffans väg 435, Strandliden, S-655 92 Karlstad (SE)

(*) Notice: Subject to any disclaimer, the term of this patent is extended or adjusted under 35 U.S.C. 154(b) by 0 days.

(21) Appl. No.: 10/889,928

(22) Filed: Jul. 13, 2004

(65) Prior Publication Data

US 2005/0034699 A1 Feb. 17, 2005

Related U.S. Application Data

(63) Continuation-in-part of application No. PCT/SE02/02459, filed on Dec. 30, 2002.

(51) Int. Cl.$^7$ .................................................. F02N 3/00
(52) U.S. Cl. .................................. 123/188.3; 123/188.4
(58) Field of Search ........................... 123/188.2, 188.3, 123/188.4, 188.5

(56) References Cited

U.S. PATENT DOCUMENTS 5,524,579 A    6/1996    Eluchans

FOREIGN PATENT DOCUMENTS

| CH | 641244 A5 | 2/1984 |
|---|---|---|
| DE | 1119594 B | 12/1961 |
| SU | 1377430 A | 2/1988 |

Primary Examiner—Noah P. Kamen
(74) Attorney, Agent, or Firm—Joseph T. Leone, Esq.; DeWitt Ross & Stevens S.C.

(57) ABSTRACT

The invention is related to an arrangement that is designed to control inlet and outlet gas mixtures and is used mainly in four stroke combustion engines. Prior art designs are of a kind that limits the performance of the four-stroke engine mainly as a result of the weight and its flow-technical design. The invention resolves this problem by providing a valve design that allows both the inlet and outlet gas mixtures to flow inside and through the valve body, which facilitates a valve design that is lighter and has an higher efficiency due to the flow-technical aspects, e.g. eliminating any valve shaft obstructing the flow path.

19 Claims, 2 Drawing Sheets

OPEN

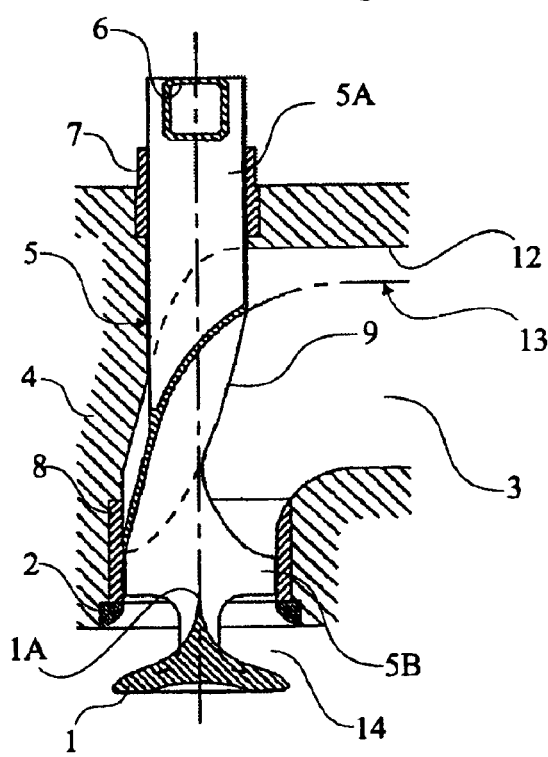
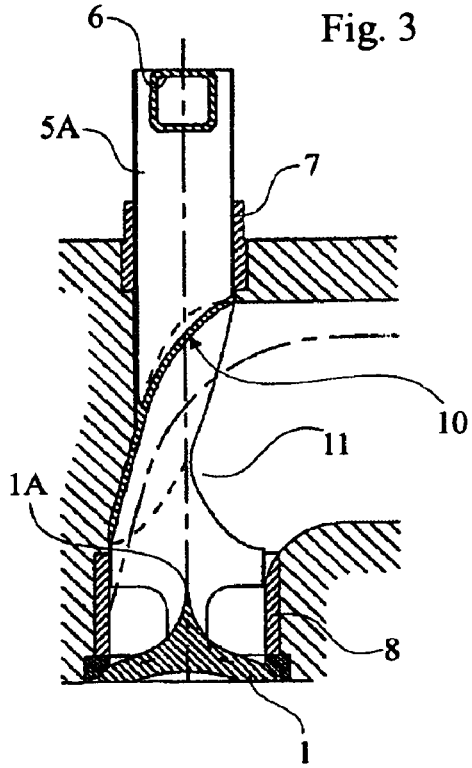
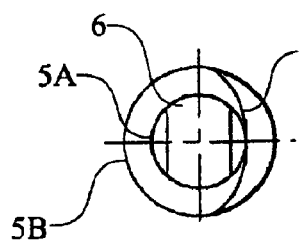

US 6,953,018 B2

VALVE ARRANGEMENT FOR A COMBUSTION ENGINE

CROSS-REFERENCE TO RELATED APPLICATIONS

This is a continuation-in-part of co-pending International Application Serial No. PCT/SE02/02459, filed Dec. 30, 2002, which claims priority to Swedish Application Serial No. SE 0200092-5, filed Jan. 14, 2002, the contents of both of which are incorporated herein.

FIELD OF THE INVENTION

The invention relates to a valve arrangement in a combustion engine for controlling inlet and outlet of gas mixtures, comprising a valve slidably housed within a cylinder head of the combustion engine, said valve including a valve plate and a stem like portion, said stem like portion having an upper portion and a lower portion, said lower portion having a valve plate attached thereto, which valve plate interacts with a valve seat to allow for outlet and inlet gases respectively to flow from and to a cylinder respectively to and from a channel respectively, which channel is housed within said cylinder head.

DESCRIPTION OF THE PRIOR ART

Control of fluid flow within internal combustion engines is an essential and well known part of the operation of combustion engines. Generally a separate intake and exhaust valve of the cam operated poppet type are provided for each engine cylinder. The function of these valves is to direct combustible fluid to the cylinder, seal the cylinder during compression in the cylinder by the piston and expansion after ignition, and to allow for the removal of the exhaust gas. Conventionally designed valves present disadvantages in their design, especially in relation to high performance combustion engines. As an example, at 11 000 rpm a four stroke engine is performing one working cycle 90 times per sec. At a speed of 18 000+rpm and still performing at high reliability a new mechanical design is needed in order to avoid the performance limits of conventional valve design.

In the past many arrangements have been proposed to improve the control of flow of inlet gases into, and exhaust gases from, the combustion chamber of an internal combustion engine, in exchange of the traditional poppet valve design. For example, from DE 11 19 594, DE 27 16 309 and CH 641 244 there are known designs which intend to improve the flow by modifying the design of how the stem portion of the valve is attached to the valve plate. From EP 1 059 423 there is shown a valve mechanism where the diameter of the tappet portion has been made larger than the diameter of the guide portion, so that the valve lifter can be miniaturized and light-weighted. In U.S. Pat. No. 5,524,579 there is shown a more complex design, comprising a rotary distribution and air cooling valve, consisting of a tube mounted having a pair of opposed side ports and an internal barrier which acts as an air fan to both cool the valve site and channel the gases in and out of the engine in timed sequence. U.S. Pat. No. 5,020,486 shows another (partly) tube formed valve mechanism, which is also very complex, wherein a partition between the inlet and exhaust tracts has gas flow ports there through moving into and out of alignment with similar gas flow ports in the valve stem and wherein the ports are arranged to permit gas flow from the inlet tract to the outlet tract when the valve is closed. In U.S. Pat. No. 5,168,843 and DE 195 23 304 there are disclosed another kind of complex valve design, wherein the valve body includes two annular seals which cooperate with two annular seats to seal the valve when the valve body is in a closed position.

Despite the above different described attempts, to try to overcome problems related to the traditional poppet valve design, there has still not yet entered any new design on the market that has been accepted, since they all suffer from one or another disadvantage

SUMMARY OF THE INVENTION

The solution according to the invention is based on the use of a valve body basically in the form of a pipe, to achieve the poppet valve mechanism used in internal combustion engine and to control the inlet and outlet of gaseous mixtures.

The design according to the invention provides numerous advantages in relation to the existing heavy weight poppet valve, e.g. increased efficiency of the gas mixture flow, improved mixture efficiency, improved ability for lubrication of the valve, improved cooling of the valve, which in turn results in higher output, higher RPM and higher fuel efficiency compared to the existing poppet valve design (see drawing B) used in today's four stroke internal combustion engines. The valve design according to the invention results in a higher output per given cylinder volume.

BRIEF DESCRIPTION OF THE DRAWINGS

In the detailed description of the invention, reference will be made to the enclosed figures, in which:

FIG. 2 shows a cross-sectional view of a preferred valve arrangement according to the invention in its open position.

FIG. 3 shows a cross-sectional view of a preferred valve arrangement according to the invention in its closed position.

FIG. 4 shows a view from above of a movable valve device of FIGS. 2 and 3.

In FIG. 1 a prior art, traditional valve design is shown. The arrangement includes a valve slidably housed by a bushing 7 within the cylinder head 4. The valve includes a valve plate 1, a stem 5 and a tappet portion 6 which comes in contact with a cam (not shown) disposed at an upper side of the cylinder head 4 of an internal combustion engine. At the lower end of the stem 5 the valve plate 1 interacts with a valve seat 2, which normally is closed by the action of a spring (not shown) that urges the valve upwards. Thus, the valve is moved in its axial direction, by the cam, thereby to open and close a suction port 3 or an exhaust port at which the valve is provided. The specific weight of the valve of this type of traditional valve is high and the cooling area is low. Moreover the cylinder head 4 has to be relatively high as a result of the existing valve design. This traditional design has shown to be a reliable and functional over the last hundred years period of operation, but the design has some limits in terms of performance. In fact the design limits the performance of four-stroke combustion engines.

Figure 1:
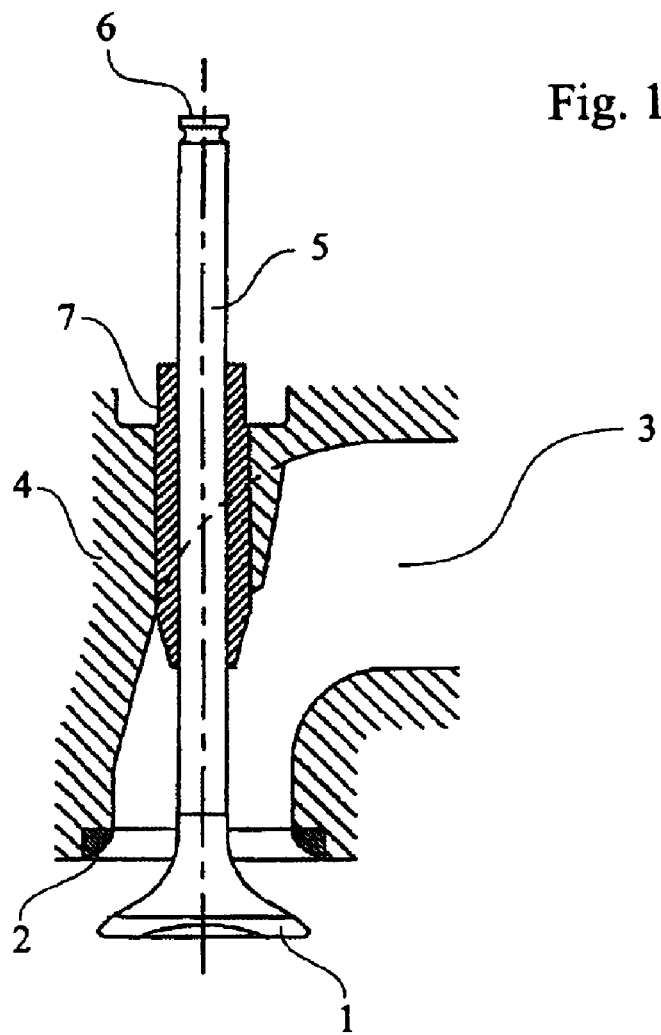
FIG. 1 shows a cross-sectional view of a prior art valve.

A four-stroke engine could be looked upon like an air-pump, if it possible to increase the RPM a higher output will be achieved. The prior art design provides limited possibilities to improve flow efficiency/mixing efficiency and has a too high specific weight related to the moveable parts of the valve arrangement. As a result the valve lope, from closed-open-closed, may end up to "float", whereby the anticipated flow of the desired closed-open-close activities will newer occur, which in turn leads to under performance. Moreover a valve spring, urging with high force, (to be able to close the valve at high rpm conditions), leads to high wear and tear and considerable power losses.

With the valve design according to the invention a weight reduction of approximately 10–20% is achieved, as a result of less material/volume relative the conventional existing valve design. Further weight savings are possible during the detailed engineering, by improved possibility of optimization of the number of valves per cylinder. Furthermore the valve design according to the invention provides improved possibilities to improve flow efficiency and mixing efficiency.

In FIGS. 2 and 3 there is shown a cross-sectional view of a preferred valve arrangement according to the invention in its opened and closed position respectively. The arrangement includes a valve slidably housed by an upper bushing 7 and a lower bushing 8, within the cylinder head 4. The valve includes a valve plate 1, a stem like portion 5 and a tappet device 6. In this preferred embodiment the tappet device 6, is in the form of a rectangular cross bar intended for interaction with a linkage device (not shown) for movement of the valve in both directions, i.e. upwards and downwards, which eliminates the need of any spring (thereby further reducing weight). However, the basic concept of the invention is applicable also when using a traditional tappet device 6 (as described above).

The stem like portion 5 is in the form of a pipe, having an upper portion 5A with a first diameter and a lower portion 5B having a larger diameter than the upper portion 5A. By means of this design the extension of the wall holding the lower bushing 8 may be formed to have at tapered portion whereby optimised control of the flow path of the gas mixtures in to and out from the channels in the cylinder head 4 may be achieved. At the lower end of the lowermost portion 5B there is valve plate 1, which interacts with a valve seat 2. Thus, the valve is moved in its axial direction, by means of the tappet device 6, to open and close the channel 3, which in this case is an exhaust port 3 delimited by the surrounding wall 12.

The valve body according to the invention can be denoted a pipe valve, since the flow of gas mixture (both in and out) will flow through and inside the lowermost portion 5B of the valve, in to (or out from) the channel 3 via a sideward facing opening 11, which is formed by an annular valve outlet/inlet edge 9 adapted to the channel 3, such that the upper end of the valve edge 9 is substantially in level with the upper portion of the wall 12 of the channel when the lower end of the valve edge 9 is substantially in level with the lower portion of the wall 12.

A guide plate 10 is preferably arranged within the transition zone from the lowermost portion 5B to the uppermost portion 5A.(It is to be understood that the basic advantages of the invention may be achieved without the use of a guide plate 10.) This guide plate 10 forms a curved surface, arranged with one or more radiuses, adapted to smoothly redirect the flow of gases in to (or out from) a substantially vertical flow path within the lowermost portion 5B to a substantially horizontal flow path within the channel 3. It is to be understood that the channel 3 may be directed/positioned in varying ways within the cylinder head, as is known per se, and that the basics of the above teaching is applicable independent of exactly how much the gases are redirected.

The valve plate 1 is attached to the lowermost portion 5B, so as to form an opening 14, by means of which gases can move (in both directions) between the cylinder and the inside of the lowermost portion 5B, when the valve is in its opened position (see FIG. 2).In its closed position (see FIG. 3) the valve plate 1 will seal against the seat 2 to hinder any flow in any direction. The valve plate 1 is attached to the lowermost portion 5B by means of a connecting zone which has a favourable flow design (e.g. streamline shaped, and preferably also flow redirecting portions) that will let the gas mixtures flow in an optimal manner, i.e. a flow optimized design that allows for undisturbed flow (without any valve shaft, or any other obstructing device positioned direct in the flow path) and which design preferably may be adapted to achieve different flow patterns (e.g. a swirl) in different engines.

If the valve is provided at a channel 3 of a suction port, having the same dimensions as described above, the opening edge 9 will be slightly larger to allow for the upper portion of surrounding wall 13 (see indication in FIGS. 2 and 3), to be substantially in level with the upper end of the valve edge 9 (see FIG. 2) when the valve is in its open position, whereas that upper edge 9 will be positioned above the upper portion of surrounding wall 13 when the valve is closed. Thanks to this adaptation an unobstructed flow may be achieved, i.e. no protruding portions are positioned within the flow path between the wall 13 and guide plate 10. In other respects, the design for valve provided at a channel 3 of a suction port is the same as the one provided at a channel 3 of an outlet port. Hence, an inlet valve has the same design as the outlet valve but with an opening adjusted to the cylinder head inlet channel 3, to increase the flow efficiency through the valve and the cylinder head 4, i.e. not to cause any undesired pressure loss when an exhaust valve is in a closing process, nor when an inlet valve is in the opening process.

The valve stem device 5 according to the invention has a considerably larger diameter compared to known valve solutions. This leads to a lighter valve with a larger cooling area as a result of the thinner pipe wall. In FIG. 4, which is a view of the valve stem device 5 from above, this feature of the invention is especially apparent. However it is evident that the same diameter may be used at both portions 5A, 5B of the stem device, without departing from the scope of the invention.

The valve arrangement according to the invention has a working cycle as follows, for an outlet valve. In FIG. 2 the valve stem has been moved down ward, allowing the outlet gas mixture to flow from the cylinder, past the valve plate 1, into the gap 14 and into the inner space circumvented by the annular portion of the lowermost portion 5B of the hollow valve body. The mixture then flows up through the valve and is redirected by the guide plate 10 into a horizontal path to escape through the opening 11 into the channel 3 in the cylinder head 4. After terminated outflow of outlet gases, the valve stem device 5 will be moved by means of the link system (not shown) acting on the tappet device 6, to close the valve plate 1, as shown in FIG. 3. For an inlet valve the same applies but vice versa and with a larger edge 9, to form a larger opening 11, as indicated by lowering the upper part of the inner wall 13 in FIGS. 1 and 2.

It is evident that the guiding means 7, 8 according to the invention, using two bushings distantly positioned within the cylinder head 4 in combination with the large diameters that provide large total guidance surfaces, will allow for optimal performance over a longer distance/time compared with the conventional existing design.

The increased rpm as a function of the lower specific weight will result in increased pump capacity for a given cylinder volume. As a result of the lighter design the output will increase approximately 15% compared to the existing conventional design. The new innovative valve design could preferably be designed to be controlled by a link system both in closed and opened position, which will reduce the weight further as a result of reduction of clips that hold the valve spring in position on a conventional valve design.

What is claimed is:

1. A valve arrangement in a combustion engine for controlling inlet and outlet of gas mixtures, comprising a valve slidably housed within a cylinder head of the combustion engine, the valve including a valve plate and a stem like portion, the stem like portion having an upper portion and a lower portion, the lower portion having a valve plate attached thereto, which valve plate interacts with a valve seat to allow for outlet and inlet gases respectively to flow from and to a cylinder respectively to and from a channel respectively, which channel is housed within the cylinder head, wherein the lower portion forms a hollow annular body to allow for the inlet and outlet gas mixtures to be transported through the valve, wherein the valve plate is connected to the lower portion to form a gap there between to allow for outlet gas mixtures to be transported past the valve plate into the inside of the hollow annular body and to allow for inlet gas mixtures to be transported from the inside of the hollow annular body past the valve plate, and, wherein the lower portion comprises an annular edge forming an opening to allow for outlet gas mixtures to be transported out from the inside of the hollow annular body into the channel within the cylinder head and to allow for inlet gas mixtures to be transported out from the channel into the inside of the hollow annular body.

2. The valve arrangement according to claim 1, wherein a guide plate is positioned within the lower portion to redirect the flow path of the outlet and inlet gases respectively.

3. The valve arrangement according to claim 1, wherein the guide plate is arranged with one or more radiuses.

4. The valve arrangement according to claim 1, wherein the lower portion is made up by a thin walled, partly cylindrical portion.

5. The valve arrangement according to claim 1, wherein the valve is slidably housed within the cylinder head by means of two bushings.

6. The valve arrangement according to claim 5, wherein the bushings have different inner diameters.

7. The valve arrangement according to claim 1, wherein the valve plate is arranged with an upper surface that is formed to allow for a higher flow efficiency of the gas mixture trough the valve.

8. The valve arrangement according to claim 1, wherein also the upper portion of the stem like device comprises a hollow body.

9. The valve arrangement according to claim 8, wherein the upper portion has a cylindrical design.

10. The valve arrangement according to claim 9, wherein upper portion has the same diameter as the valve body or smaller.

11. The valve arrangement according to claim 8, wherein the upper portion of the stem like portion has a tappet device in form of a connector/lift arrangement extending across the hollow body without obstructing the flow path within the hollow body.

12. The valve arrangement according to claim 1, wherein the valve extends in a direction that coincides with the direction of flow of gas mixtures out from the cylinder.

13. A method for controlling inlet and outlet of gas mixtures in a combustion engine, comprising the steps of:

providing a valve arrangement having a valve slidably housed within a cylinder head of the combustion engine, the valve including a valve plate and a stem like portion, providing a stem like portion having an upper portion and a lower portion, the lower portion having a valve plate attached thereto, which valve plate interacts with a valve seat to allow for outlet and inlet gases respectively to flow from and to a cylinder respectively to and from a channel respectively, which channel is housed within the cylinder head, providing the lower portion to form a hollow annular body and an annular edge forming an opening, providing the valve plate to be connected to the lower portion to form a gap there between, allowing outlet gas mixtures to be transported past the valve plate, into the inside of the hollow annular body, through the hollow annular body and past the edge to escape into the channel, and, allowing inlet gas mixtures to be transported from the channel, past the edge into the inside of the hollow annular body, through the hollow annular body and past the valve plate into the cylinder.

14. The method according to claim 13, providing a guide plate within the lower portion to redirect the flow path of the outlet and inlet gases respectively.

15. The method according to claim 13, providing the guide plate with one or more radiuses.

16. The method according to claim 13, proving the lower portion in the form of a thin walled, partly cylindrical portion.

17. The method according to claim 13, providing the valve slidably housed within the cylinder head by means of two bushings.

18. The method according to claim 17, proving the bushings with different inner diameters.

19. The method according to claim 13, providing the valve to extend in a direction that coincides with the direction of flow of gas mixtures out from the cylinder.

* * * * *